United States Patent
Denisenko

(10) Patent No.: US 10,474,441 B1
(45) Date of Patent: Nov. 12, 2019

(54) METHOD AND APPARATUS FOR PERFORMING AUTOMATIC DATA COMPRESSION ALGORITHM SELECTION DURING HIGH-LEVEL COMPILATION

(71) Applicant: Altera Corporation, San Jose, CA (US)

(72) Inventor: Dmitry N. Denisenko, Toronto (CA)

(73) Assignee: Altera Corporation, San Jose, CA (US)

(*) Notice: Subject to any disclaimer, the term of this patent is extended or adjusted under 35 U.S.C. 154(b) by 344 days.

(21) Appl. No.: 13/760,516

(22) Filed: Feb. 6, 2013

(51) Int. Cl.
*G06F 8/41* (2018.01)

(52) U.S. Cl.
CPC .................. *G06F 8/41* (2013.01)

(58) Field of Classification Search
CPC ................. G06F 8/41; G06F 8/443
USPC ........................................ 717/140
See application file for complete search history.

(56) References Cited

U.S. PATENT DOCUMENTS

| | | | |
|---|---|---|---|
| 5,764,994 A * | 6/1998 | Craft | G06F 8/427 712/211 |
| 6,066,178 A * | 5/2000 | Bair | G06F 17/5045 708/625 |
| 6,145,069 A * | 11/2000 | Dye | H03M 7/30 345/501 |
| 6,883,147 B1 * | 4/2005 | Ballagh | G06F 17/5045 716/102 |
| 7,770,156 B2 * | 8/2010 | Thekkath | G06F 11/364 717/128 |
| 2004/0111710 A1 * | 6/2004 | Chakradhar | G06F 9/445 717/136 |
| 2007/0277161 A1 * | 11/2007 | Herbordt | G06F 8/447 717/140 |
| 2008/0295045 A1 * | 11/2008 | Aktouf | G06F 17/5045 716/136 |
| 2010/0223237 A1 * | 9/2010 | Mishra | G06F 9/30156 707/693 |
| 2011/0307875 A1 * | 12/2011 | Xu | G06F 8/437 717/151 |
| 2012/0259822 A1 * | 10/2012 | Medgyesi et al. | 707/693 |
| 2013/0074033 A1 * | 3/2013 | Hall | G06F 17/5045 717/109 |
| 2013/0262809 A1 * | 10/2013 | Wegener | G06F 12/08 711/165 |

OTHER PUBLICATIONS

Bordawekar et al., "Compilation and Communication Strategies for Out-of-Core Programs on Distributed Memory Machines", Journal of Parallel and Distributed Computing, 1996, 12pg.*
Catanzaro et al., "Copperhead: Compiling an Embedded Data Parallel Language", ACM, 2011, 10pg.*
(Continued)

*Primary Examiner* — Ryan D. Coyer

(57) ABSTRACT

A method for performing a high-level compilation of a computer program language (CPL) description of a system to generate a hardware description language (HDL) of the system includes inserting one or more compression/decompression units into the HDL in response to detecting a user inserted term in a kernel definition of an argument in the CPL description to indicate that the argument requires compression.

27 Claims, 13 Drawing Sheets

(56) References Cited

OTHER PUBLICATIONS

Chen et al., "Fractal Video Compression in OpenCL: An Evaluation of CPUs, GPUs, and FPGAs as Acceleration Platforms", IEEE, 2013, 8pg.*
Ozturk et al., "Using Data Compression for Increasing Memory System Utilization", IEEE, 2009, 14pg.*
Banerjee et al., "A MATLAB Compiler for Distributed, Heterogeneous, Reconfigurable Computing Systems", IEEE, 2000, 10pg.*
Qin et al., "A Universal Placement Technique of Compressed Instructions for Efficient Parallel Decompression", IEEE, 2009, 13pg.*
Soderman, Donald, "Implementing C Designs in Hardware", ASIC Design & Marketing, 1998, 12pg.*
Wiercinski, Tomasz, "Usage of C/C++ languages with OpenMP directives to embedded systems design", ISSN 1898-5297, 2009, 8pg.*
Ozturk, et al.; "Compiler-Guided Data Compression for Reducing Memory Consumption of Embedded Applications", ASP-DAC '06 Proceedings of the 2006 Asia and South Pacific Design Automation Conference, pp. 814-819.
Calderbank, et al.; "Wavelet Transforms That Map Integers to Integers", Sep. 11, 1996; revised Aug. 29, 1997; Applied and Computational Harmonic Analysis 5, 332-369 (1998), Article No. HA970238.

* cited by examiner

US 10,474,441 B1

METHOD AND APPARATUS FOR PERFORMING AUTOMATIC DATA COMPRESSION ALGORITHM SELECTION DURING HIGH-LEVEL COMPILATION

FIELD

Embodiments of the present invention relate to tools for designing systems on target devices. More specifically, embodiments of the present invention relate to a method and apparatus for performing automatic data compression algorithm selection during high-level compilation.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices.

Among the procedures performed by EDA tools in a computer aided design (CAD) compilation flow are high-level compilation and hardware description language (HDL) compilation. High-level compilation (or "high-level synthesis") involves generating an HDL of a system from a computer language description of the system. The computer language description of the system may be, for example, in Open Computing Language (OpenCL) format or another computer language description format. OpenCL is a framework for writing programs that execute across heterogeneous platforms. OpenCL includes a language for writing kernels and application programming interfaces (APIs) that are used to define and control platforms. HDL compilation involves performing synthesis, placement, routing, and timing analysis of the system on the target device.

SUMMARY

According to embodiments of the present invention, methods and apparatus for performing automatic data compression algorithm selection during high-level compilation are disclosed. A high-level compiler selects an appropriate at-speed compression algorithm for a compression/decompression unit to use on data based on its data type as identified in a kernel argument definition. According to an embodiment of the present invention, the high-level compiler also instantiates appropriate hardware in a target device to perform the compression. A user/programmer is required to add a term in the kernel definition of an argument in a computer program language description of the system to signal that the argument requires compression.

According to an embodiment of the present invention, a method for performing a high-level compilation of a computer program language description (CPL) description of a system to generate a hardware description language (HDL) of the system is disclosed. One or more compression/decompression units are inserted into the HDL in response to detecting a user inserted term in a kernel definition of an argument in the CPL description to signal that the argument requires compression. According to an aspect of the present invention, the user inserted term may indicate that only data associated with the argument that is transmitted over an IO interface requires compression, and/or only data associated with the argument that is transmitted to a memory requires compression.

According to an embodiment of the present invention, a method for performing a high-level compilation of a CPL description of a system to generate a HDL of the system is disclosed. The high-level compilation assigns a compression/decompression algorithm to be implemented by a compression/decompression unit in response to a data type of an argument requiring compression. According to an aspect of the present invention, the data type of the argument may be an integer, single-precision floating point, a double-precision floating point, a structure, and/or other simple or complex data type.

According to an embodiment of the present invention, a method for analyzing a system on a target device is disclosed. A compression status of data associated with arguments stored in a memory of the target device is tracked. A notification is generated when an operation executed on the target device expects data associated with one argument to be in a compression state that is inconsistent with its compression status.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
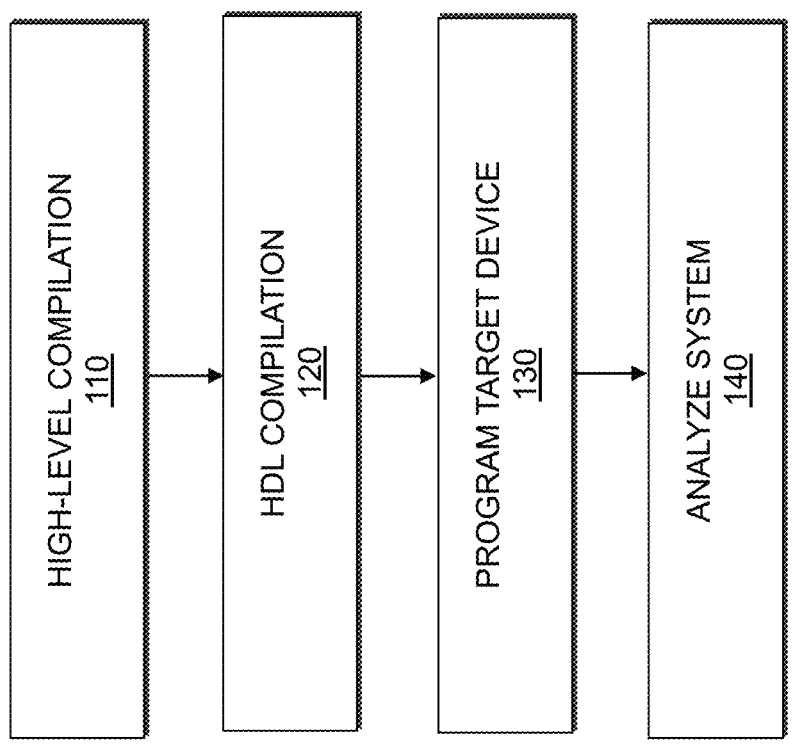
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other device whose functionality is described by a hardware description language (HDL). According to one embodiment, the procedure illustrated in FIG. 1 may be performed by one or more computer aided design (CAD)/electronic design automation (EDA) tools implemented on a computer system.

At 110, high-level compilation is performed where a high-level kernel description is compiled into hardware description language (HDL). The high-level kernel description may be a computer program language (high-level) description of the system such as OpenCL or other language or format. The HDL may be, for example, Verilog, VHDL or other hardware description language. According to an embodiment of the present invention, the high-level kernel description includes one or more terms in a kernel definition, provided by a user, to identify arguments which require data compression. During the high-level compilation 110, one or more compression/decompression units are inserted into the HDL to facilitate the data compression in response to the one or more terms.

At 120, the HDL generated at 110 is compiled into a program file. According to an embodiment of the present invention, HDL compilation involves synthesis, placement, routing, and timing analysis. According to an embodiment of the present invention, HDL compilation also involves generation of report files that describe the target device's area usage and timing information.

At 130, the target device is programmed using the program file generated at 120 to implement the system. By programming the target device, generic programmable resources on the target device may be used to implement function specific components as described in the high-level kernel description and HDL of the system.

At 140, the system implemented on the target device is analyzed. According to an embodiment of the present invention, analysis of the target device may include identifying issues with the implementation of compression/decompression units and evaluating the efficiency of utilizing compression/decompression units. Notifications may be provided to the user if issues are identified or evaluations do not meet expectation.

Figure 2:
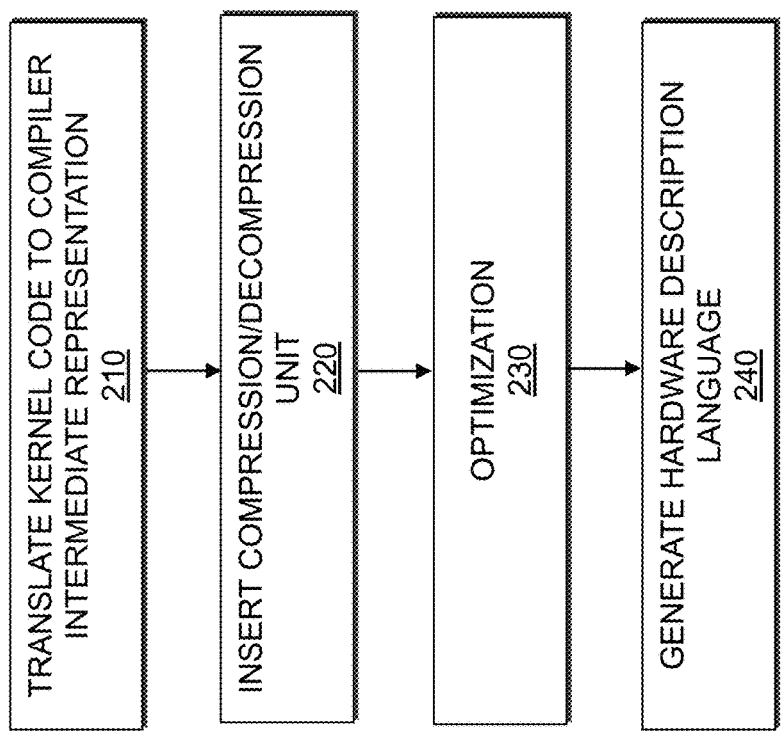
FIG. 2 is a flow chart illustrating a method for performing high-level compilation according to an embodiment of the present invention.

FIG. 2 is a flow chart illustrating a method for performing high-level compilation according to an embodiment of the present invention. According to an embodiment of the present invention, the procedures shown in FIG. 2 may be used to implement procedure 110 shown in FIG. 1. At 210, kernel code is translated to compiler intermediate representation. According to an embodiment of the present invention, the compiler intermediate representation of the kernel code includes a sequence of functions and a data storage. Each function is a sequence of instructions grouped into basic blocks. A basic block is a contiguous sequence of instructions with one entry point and one exit point. An instruction in the middle of a basic block may be a function call, but may not count as an exit point from the basic block. Each basic block terminates with either (1) branch (possibly conditional), or (2) a return from the function. A barrier synchronization primitive is expressed as a function call to a special barrier function. The kernel code also includes a system description of the eventual hardware target system implemented. According to an embodiment of the present invention, the translation may be performed by a compiler front end.

At 220, for arguments in the kernel definition that include a term to indicate that the arguments require data compression, one or more compression/decompression units are inserted into the HDL to facilitate the data compression. Compression/decompression algorithms may be selected for each of the one or more compression/decompression units to perform in response to data types of the arguments.

At 230, the compiler intermediate representation is transformed and optimized by mapping it to hardware constructs.

At 240, HDL is generated for the design of the system. The HDL describes the operation of the system to be programmed on the target device. The HDL description provides high-level representations of a circuit in terms of the flow of signals (or transfer of data) between hardware registers, and the logic operations performed on those signals.

Many data streams in real-world applications are highly compressible by available real-time algorithms. However, determining how to implement the compression and which algorithm to use is a decision that requires additional work from the user. By having these decisions performed automatically during high-level compilation reduces the work required by the user.

When using compression for data transfers between a target device and an external component, compression must be performed by the external component before sending the data and by the target device after it arrives on its input output (IO) interface. When performing compression on the target device, a compression/decompression unit may either be implemented to decompress data associated with an argument before it is stored in memory (as an IO interface compression/decompression unit) or be implemented to decompress the data after it is read from memory and before it is transmitted to an LSU (as an LSU compression/decompression unit). When compression is used for transfers between the target device and the external component and for transfers between the memory and all LSUs, an IO interface compression/decompression unit is not required. The compressed data received from the IO interface may be written in compressed form onto the memory. An LSU compression/decompression unit would decompress the data as it is requested by an LSU and would compress the output as it is produced.

When all LSUs are capable of accessing compressed data from a memory, a single memory controller compression/decompression unit may be used in place of any IO compression/decompression units. However, when an LSU is required to perform random indexing, the LSU may not read compressed data from the memory in a consecutive fashion and thus requires that a separate compression/decompression unit, such as an IO interface compression/decompression unit be used to decompress data prior to storage of the data on the on-board memory. According to an embodiment of the present invention, random indexing involves using A[idx] with non-consecutive values of idx. The actual location in memory of A[idx] may be computed as A+idx*sizeof(single value). Since compression may produce different sizes for different values, this arrangement will not work. A high-level compiler can automatically determine if a given LSU accesses data sequentially or randomly.

Figure 3:
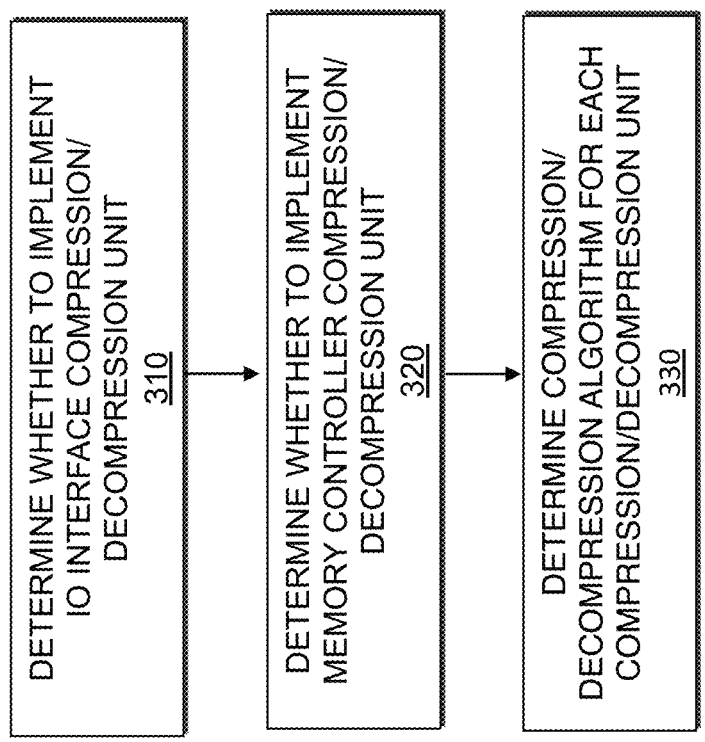
FIG. 3 is a flow chart illustrating a method for performing compression/decompression unit insertion according to an embodiment of the present invention.

FIG. 3 is a flow chart illustrating a method for performing compression/decompression unit insertion according to an embodiment of the present invention. According to an embodiment of the present invention, the procedures illustrated in FIG. 3 may be used to implement procedure 220 shown in FIG. 2. At 310, it is determined whether a compression/decompression unit is to be implemented at an IO interface for an LSU. The compression/decompression unit would be an IO interface compression/decompression unit operable to decompress data to be accessed by the LSU prior to storing the data on a memory and to compress data from the LSU prior to transmitting the data to an external component.

At 320, it is determined whether a compression/decompression unit is to be implemented as a load store unit (LSU) compression/decompression unit. The LSU compression/decompression unit would be operable to decompress compressed data stored in a memory prior to sending it to an LSU and to compress uncompressed data from the LSU prior to storing it on the memory.

At 330, compression/decompression algorithms are determined for each of the compression/decompression units identified at 310 and 320.

Figure 4:
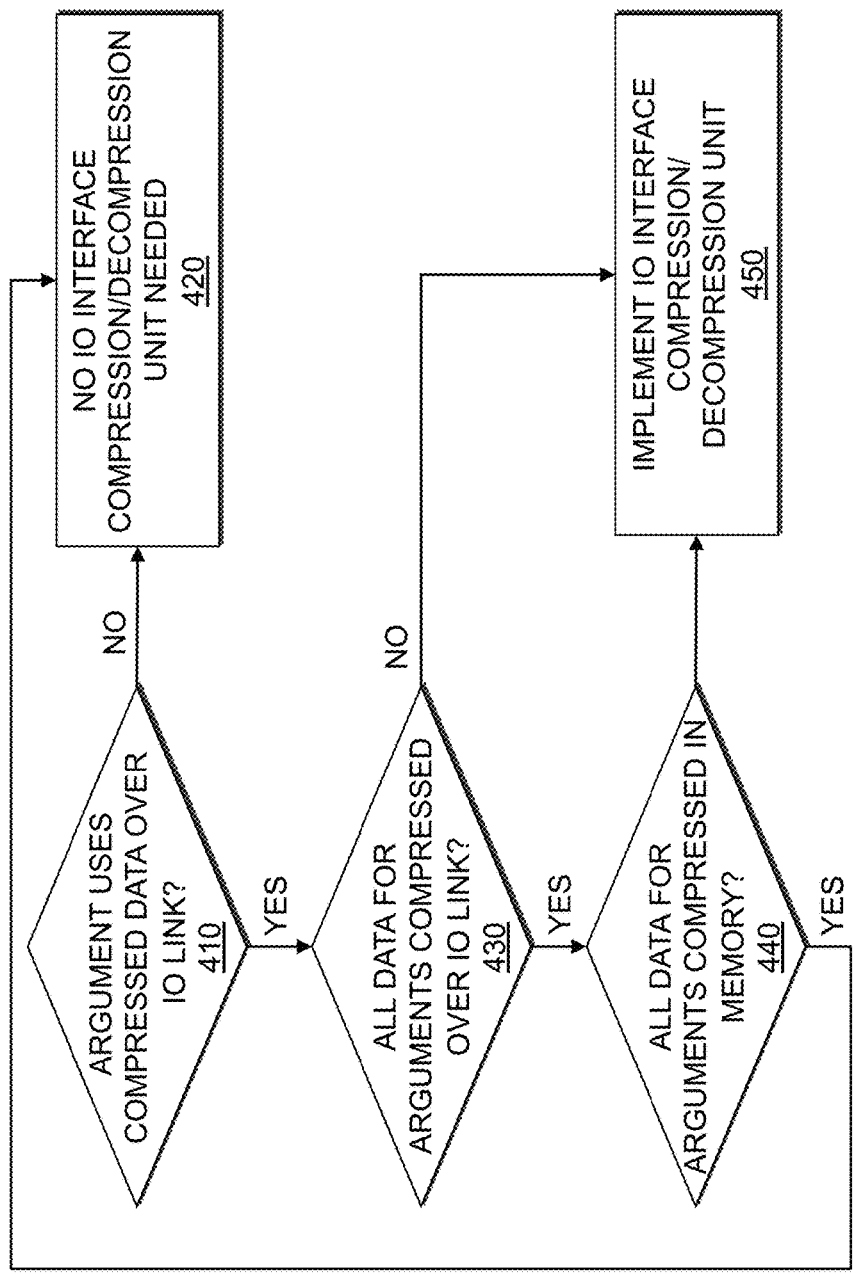
FIG. 4 is a flow chart illustrating a method for determining whether to implement a compression/decompression unit at an input output interface according to an embodiment of the present invention.

FIG. 4 is a flow chart illustrating a method for determining whether to implement a compression/decompression unit at an IO interface according to an embodiment of the present invention. According to an embodiment of the present invention, the procedures shown in FIG. 4 may be used to implement procedure 310 shown in FIG. 3. At 410, it is determined whether at least one argument in a computer program language (high-level) description of a system to be implemented on a target device uses compressed data transmitted over an IO link connecting a target device to an external component. The argument may be a variable or parameter that represents data. If it is determined that no argument uses compressed data transmitted over the IO link, control proceeds to 420. If it is determined that at least one argument uses compressed data transmitted over the IO link, control proceeds to 430.

At 420, no IO interface compression/decompression unit is implemented.

At 430, it is determined whether all data associated with the arguments in the computer program language description of the system are compressed over the IO link. If it is determined that not all of the data associated with the arguments is compressed over the IO link, control proceeds to 440. If it is determined that all of the data associated with the arguments is compressed over the IO link, control proceeds to 450.

At 440, it is determined whether all data associated with arguments in the computer program language description of the system can be stored in compressed form in a memory. The memory may be an on-board memory residing on the target device or an on-board memory residing off the target device, but on a board which the target device resides on. According to an embodiment of the present invention, if data for an argument is accessed by an LSU which implements random indexing, that data cannot be stored in a compressed form in the memory. Whether an LSU implements random indexing may be determined by analyzing the computer program language description of an operation associated with the LSU. If it is determined that all data associated with the arguments can be stored in compressed form in the memory, control returns to 420. If it is determined that not all data associated with the arguments can be stored in compressed form in the memory, control proceeds to 450.

At 450, an IO interface compression/decompression unit is implemented. The IO interface compression/decompression unit may operate to decompress data associated with an argument prior to storing the data into the on-board memory. The IO interface compression/decompression unit may operate to compress data associated with the argument prior to transmitting it to the IO interface.

Figure 5:
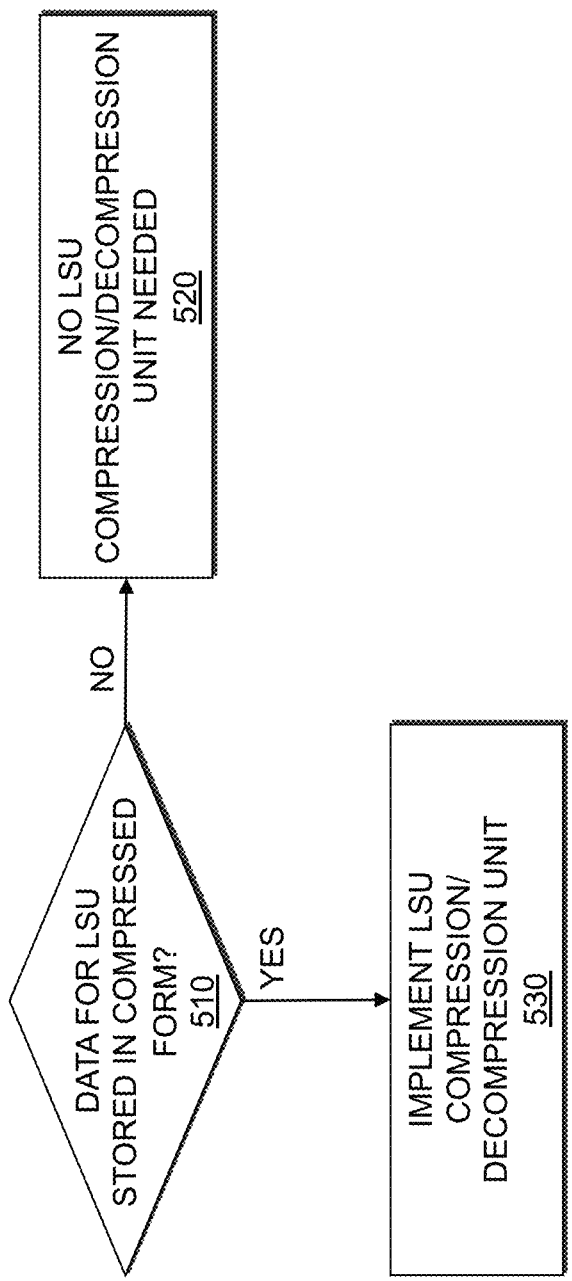
FIG. 5 is a flow chart illustrating a method for determining whether to implement a compression/decompression unit at a load store unit according to an embodiment of the present invention.

FIG. 5 is a flow chart illustrating a method for determining whether to implement a compression/decompression unit at a load store unit (LSU) according to an embodiment of the present invention. The procedures illustrated in FIG. 5 may be used to implement procedure 320 shown in FIG. 3. At 510 it is determined whether data for a LSU is stored in a compressed state in a memory. The memory may be an on-board memory residing on the target device or an on-board memory residing off the target device, but on a board which the target device resides on. If it is determined that data for the LSU is not stored in a compressed state in the memory, control proceeds to 520. If it is determined that data for the LSU is stored in a compressed state in the memory, control proceeds to 530.

At 520, no LSU compression/decompression unit is needed.

At 530, an LSU compression/decompression unit is implemented.

According to an embodiment of the present invention, the procedures illustrated in FIG. 5 may be performed on each LSU in a computer program language description of a system. When a plurality of LSU compression/blocks is required, one or more of the LSU compression blocks may be merged together in order to reduce area utilization on a target device.

Figure 6:
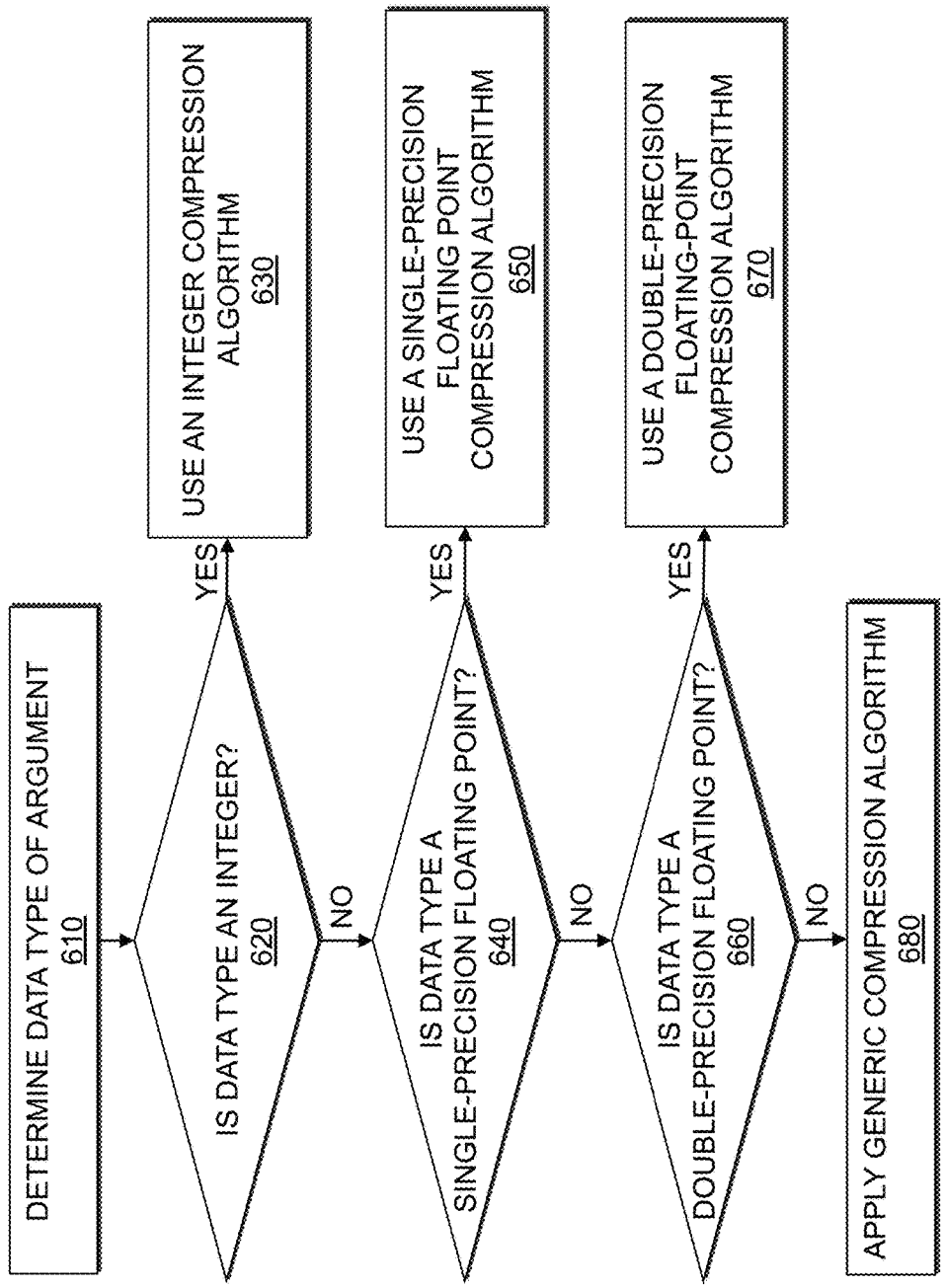
FIG. 6 is a flow chart illustrating a method for determining a compression/decompression algorithm to implement on a compression/decompression unit according to an embodiment of the present invention.

FIG. 6 is a flow chart illustrating a method for determining a compression/decompression algorithm to implement on a compression/decompression unit according to an embodiment of the present invention. The procedures illustrated in FIG. 6 may be used to implement 330 illustrated in FIG. 3 and may be performed for any of the compression/decompression units described above. At 610, a data type of an argument which requires compression is identified.

At 620 it is determined whether the data type of the argument is an integer. If it is determined that the data type of the argument is an integer, control proceeds to 630. If it is determined that the data type of the argument is not an integer, control proceeds to 640.

At 630, an integer compression algorithm is selected to be implemented for compressing/decompressing the argument. According to an embodiment of the present invention, an invertible integer wavelet transform may be used for the integer compression algorithm.

At 640, it is determined whether the data type of the argument is a single-precision floating point. If it is determined that the data type of the argument is a single-precision floating point, control proceeds to 650. If it is determined that the data type of the argument is not a single-precision floating point, control proceeds to 640.

At 650, a single-precision floating point compression algorithm is selected to be implemented for compressing/decompressing the argument.

At 660, it is determined whether the data type of the argument is a double-precision floating point. If it is determined that the data type of the argument is a double-precision floating point, control proceeds to 670. If it is determined that the data type of the argument is not a double-precision floating point, control proceeds to 680.

At 670, a double-precision floating-point compression algorithm is selected to be implemented for compressing/decompressing the argument. According to an embodiment of the present invention, an FPC double-precision floating-point compression algorithm may be used for the double-precision floating-point compression algorithm.

At 680, a generic algorithm is selected to be implemented for compressing/decompressing the argument. According to an embodiment of the present invention, the generic algorithm may be a run length encoding algorithm.

Exemplary data types and algorithm types are presented in the example above. It should be appreciated, however, that additional data types may be checked for and additional algorithm types may be utilized in the procedures. Other algorithms may also be substituted in place of the algorithms listed above. In the procedures described in FIG. 6, an argument is associated with a single data type. It should be appreciated, however, that an argument may be a complex data type that includes multiple complex and simple types. A complex data type may include multiple simple data types. A simple data type is a single value, and may be either a character, an integer, or a floating-point value. A structure is an example of a complex data type. If an argument includes a plurality of data types, a different algorithm may be selected to perform the compression/decompression from the algorithms that correspond to the underlying data types.

Figure 7:
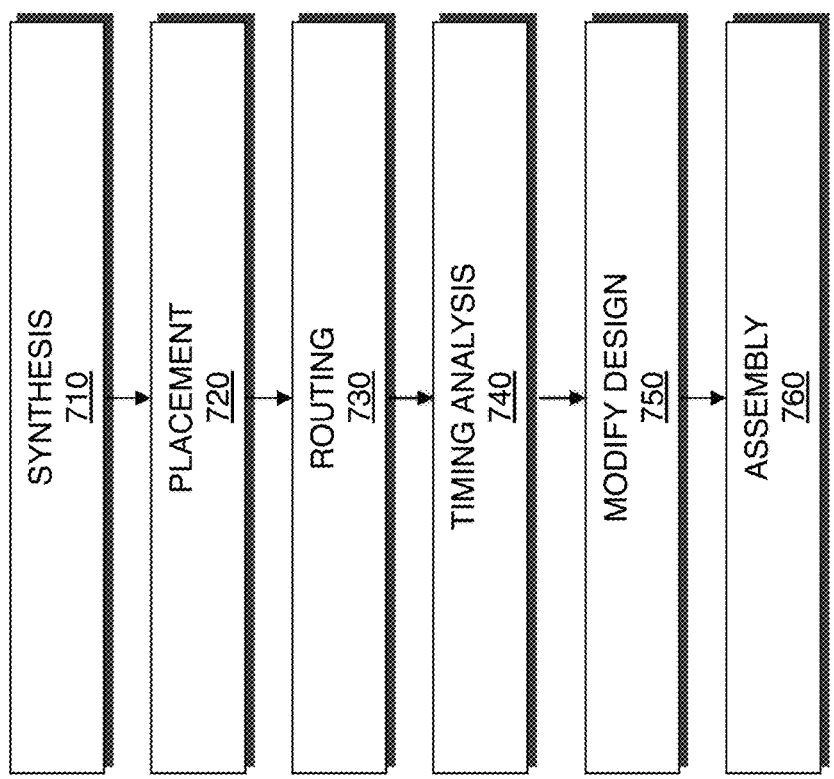
FIG. 7 is a flow chart illustrating a method for performing HDL compilation according to an embodiment of the present invention.

FIG. 7 is a flow chart illustrating a method for performing HDL compilation according to an embodiment of the present invention. According to an embodiment of the present invention, the procedures illustrated in FIG. 7 may be used to implement procedure 120 shown in FIG. 1. At 710, the system is synthesized. Synthesis includes generating a logic design of the system to be implemented by the target device. According to an embodiment of the present invention, synthesis generates an optimized logical representation of the system from an HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 720, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic device are to be used for specific logic elements, and other function blocks, determined to implement the system during synthesis. Placement may include clustering which involves grouping logic elements together to form the logic clusters present on the target device. According to an embodiment of the present invention, clustering is performed at an early stage of placement and occurs directly after synthesis during the placement preparation stage.

At 730, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 740, timing analysis is performed on the system designed by procedures 710, 720, and 730. According to an embodiment of the present invention, the timing analysis determines whether timing constraints of the system are satisfied. As part of timing analysis, slack analysis may be performed.

At 750, the design for the system is modified in response to the timing analysis. According to an embodiment of the present invention, the design for the system may be modified in response to determining that timing constraints have not been satisfied. The design for the system may be modified by a designer manually or alternatively the design may be modified automatically by the EDA tool by re-executing one or more of procedures 710, 720, and 730.

At 760, an assembly procedure is performed. The assembly procedure involves creating a program file that includes information determined by the procedures described at 710, 720, 730, 740, and 750. The program file may be a bit stream that may be used to program a target device. According to an embodiment of the present invention, the procedures illustrated in FIG. 7 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

FIGS. 1-7 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

In order to allow a high-level compiler to automatically insert compression/decompression units and select an appropriate compression/decompression algorithm for each compression/decompression unit, a user inserts a term in a kernel definition in a computer program language description of a system. The term specifies that compression is required for an argument. A first example below illustrates a computer program language description of a vector shuffle operation, where compression is required for argument A. As shown, argument A has the data type integer.

```
void vectorShuffle (compressed int*A, compressed int*B,
    compressed int*C) {
  unsigned int thread_id=get_thread_id( )
  C[thread_id]=B[A[thread_id]];
}
```

With reference to FIG. 4, the example above uses compressed data over an IO link which results in a "yes" response for the query in procedure 410. However, since argument B and argument C do not require compression, not all data for the arguments are compressed over the IO link. This results in a "no" response for the query in procedure 430. Thus, an IO interface compression/decompression unit is implemented for the operation.

With reference to FIG. 5, since data associated with argument A is compressed, but data associated with argument B is not compressed, a "yes" result is generated for the query in procedure 510 with respect to an LSU accessing data for argument A, but a "no" result is generated with respect to the LSU accessing data for argument B. Thus, an LSU compression/decompression unit is implemented for the LSU associated with argument B for the operation.

Figure 8A:
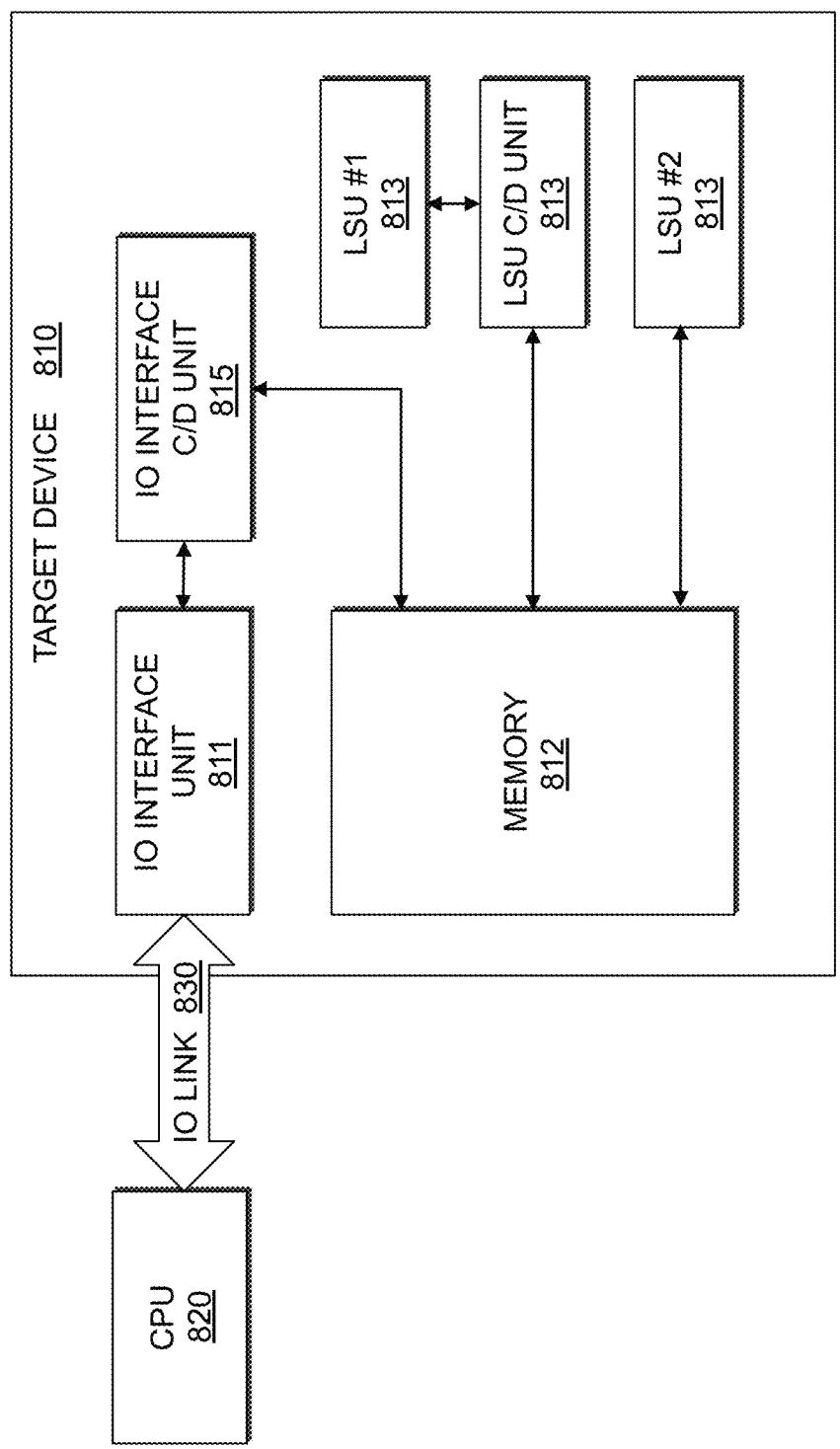
FIGS. 8A-8B illustrate a system on a target device implementing exemplary compression/decompression units according to embodiments of the present invention.

FIG. 8A illustrates a system on a target device 810 implementing compression/decompression units for performing the operation from the first example above. The target device 810 is coupled to external component which is a CPU 820 via an IO link 830. The target device 810 includes an IO interface unit 811 that is operable to couple to the IO link 830. The target device 810 also includes a memory 812. According to an embodiment of the present invention, the memory 812 may represent an on-board memory residing on the same board as the target device 810. Alternatively, the memory 812 may represent a memory interface that is electrically coupled to an on-board memory residing on a same board which the target device 810 resides on. The target device 810 includes a first LSU (LSU #1) 813 and a second LSU (LSU #2) 814. The first LSU 813 is operable to load and store data associated with argument A. The second LSU 814 is operable to load and store data associated with argument B. The target device 810 also includes an IO interface compression/decompression (C/D) unit 815 and a LSU compression/decompression unit 816.

The first LSU 813 is capable of accessing data sequentially from memory 812, however the second LSU 814 is required to access data from memory 812 randomly. Since at least one LSU cannot consume compressed data, both the IO compression/decompression unit 815 and the LSU compression/decompression unit 815 are utilized for the operation in this first example. When the IO interface unit 811 is used to transfer data for the first LSU 813, the IO interface compression/decompression unit 815 will operate in bypass mode and do nothing to the compressed data as it is stored into memory 812. However, when the IO interface unit 811 is used to transfer data for the second LSU 814, the IO compression decompression unit 815 will operate to decompress the data before it is sent to the memory 812. Since data accessed by the second LSU 814 is decompressed by the IO compression/decompression block 815, the second LSU 814 may access the data directly from the memory 812 without further decompression. However, compressed data for the first LSU 813 stored in memory 812 must be decompressed by LSU compression/decompression unit 815 prior to transmitting it to the first LSU 813.

A second example below illustrates a computer program language description of an add operation, where compression is required for arguments A, B, and C. As shown, arguments A, B, and C have the data type integer.

```
void vectorAdd (compressed int*A, compressed int*B,
    compressed int*C) {
  unsigned int thread_id=get_thread_id( )
  C[thread_id]=A[thread_id]+B[thread_id];
}
```

With reference to FIG. 4, the example above uses compressed data over an IO link which results in a "yes" response for the query in procedure 410. Since arguments A, B, and C require compression, all data for the arguments are compressed over the IO link. This results in a "yes" response for the query in procedure 430. All data associated with the arguments A, B, and C may be stored in compressed form in memory. This results in a "yes" response for the query in procedure 440. Thus, no IO interface compression/decompression unit needs to be implemented to perform this operation.

With reference to FIG. 5, since data associated with each of the arguments is stored in its compressed form, an LSU compression/decompression unit is implemented for each LSU associated with the arguments to perform this operation.

Figure 8B:
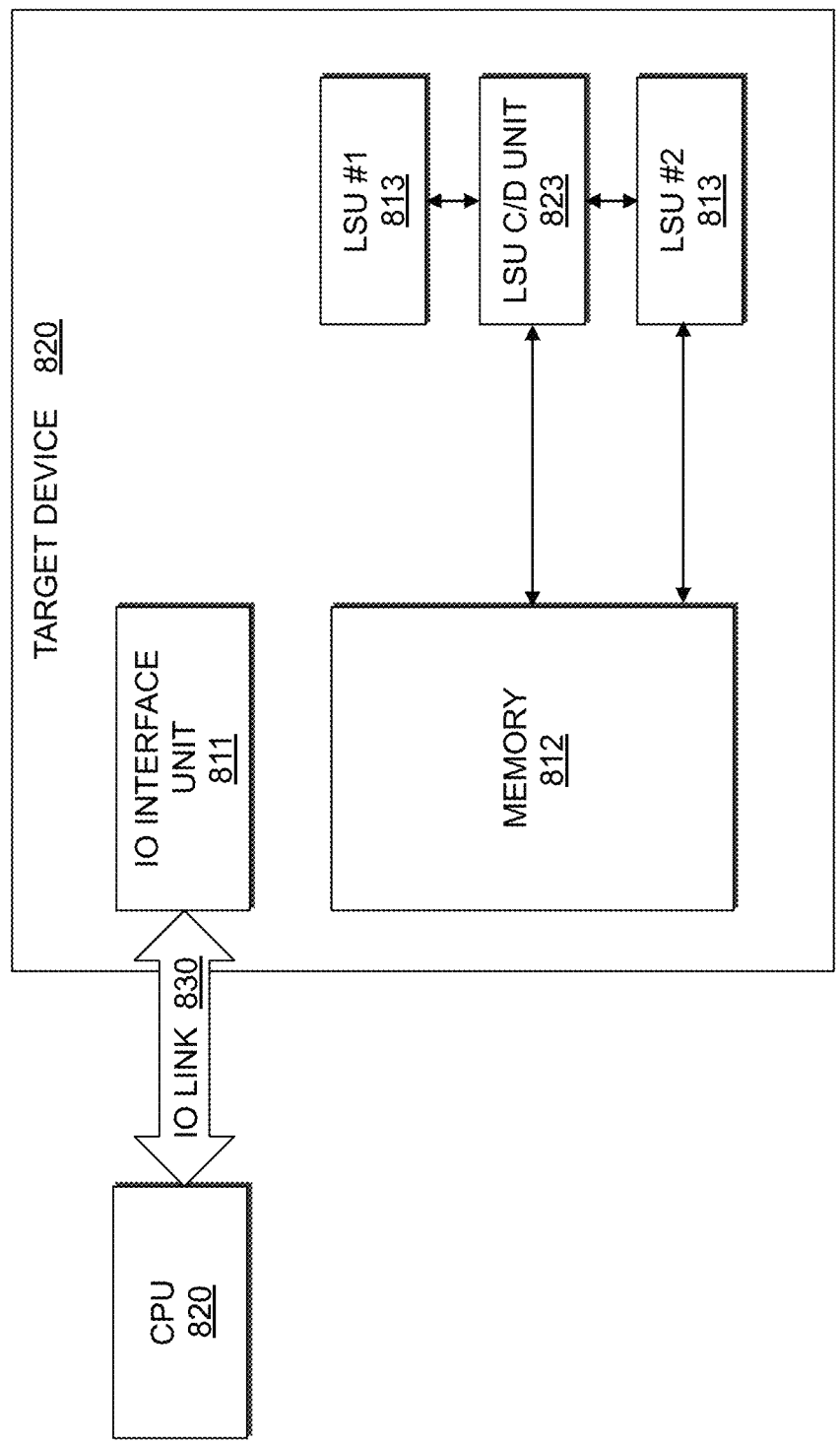

FIG. 8B illustrates a system on a target device 820 implementing compression/decompression units for performing the operation from the first example above. The components illustrated in FIG. 8B having the same numerical reference numbers as the components illustrated in FIG. 8A may be implemented similarly. Since, both the first LSU 813 and the second LSU 814 are capable of accessing data sequentially from memory 812, a IO interface compression/decompression unit is not required. Compressed data for the first LSU 813 and the second LSU 814 stored in memory 812 must be decompressed by LSU compression/decompression unit 825 prior to transmission to the LSUs. The LSU compression/decompression unit 825 is configured to perform compression/decompression operations for data associated with both the first LSU 813 and the second LSU 814.

Figure 9:
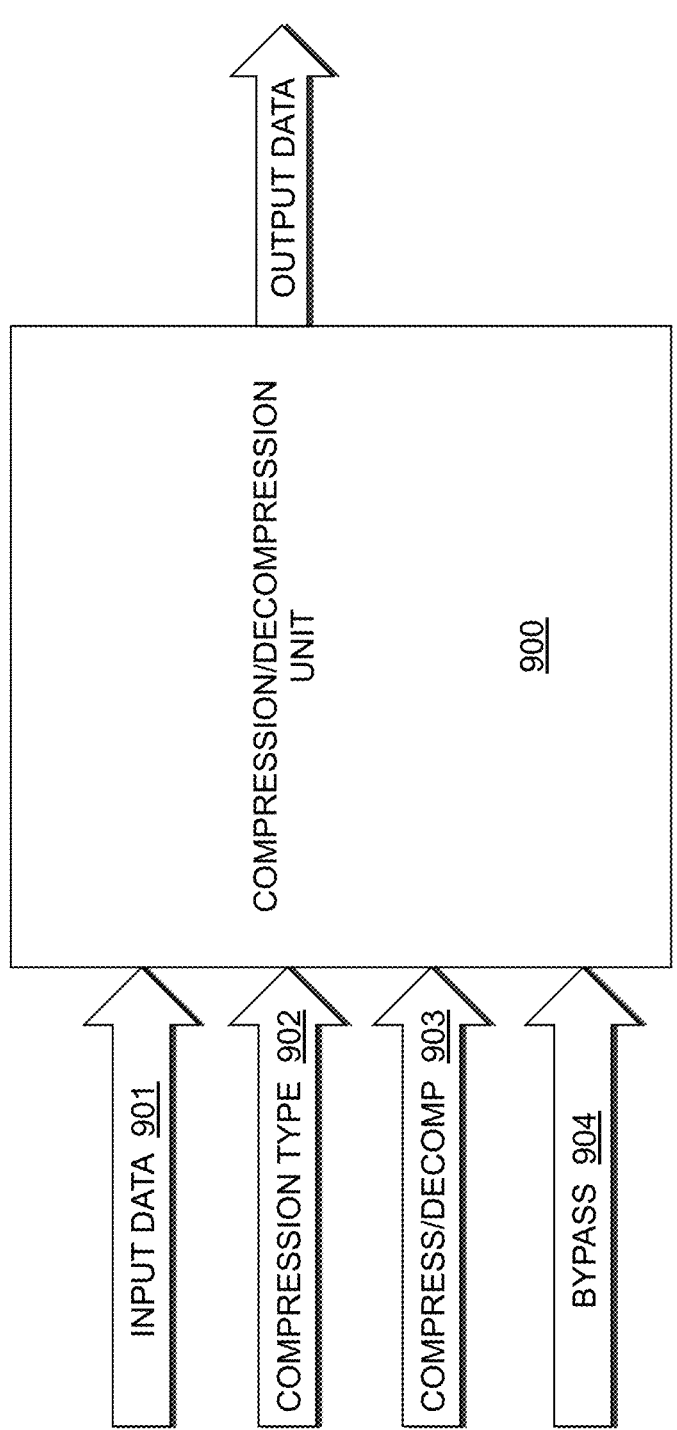
FIG. 9 illustrates an exemplary compression/decompression unit according to an embodiment of the present invention.

FIG. 9 illustrates an exemplary compression/decompression unit 900 according to an exemplary embodiment of the present invention. The compression/decompression unit 900 may be used to implement any of the IO interface compression/decompression units and/or LSU compression/decompression units illustrated in FIGS. 8A and 8B. As illustrated, the compression/decompression unit 900 includes a first interface 901 to receive input data. The input interface is sufficient to accommodate any data type supported by the system. For example, the input interface may support compression of doubles (64-bit number), floats (32-bit numbers), ints (32-bit numbers), and shorts (16-bit numbers). According to an embodiment of the present invention, the input interface is at least 64-bits wide.

A second interface 902 on the compression/decompression unit 900 is operable to receive data that is used by the compression/decompression unit 900 to select a type of compression/decompression algorithm to use. It should be appreciated that the data may be fixed at the programming time of a target device or alternatively the data may change dynamically as received by an external component. According to an embodiment of the present invention, the supported compression/decompression algorithms are stored inside the compression/decompression unit 900. This ensures that the algorithms will be available and that the compression/decompression unit will operate at a speed sufficient to support high-speed of external memory interfaces.

A third interface 903 on the compression/decompression unit 900 is operable to receive data that is used by the compression/decompression unit 900 to determine whether to perform compression or decompression.

A fourth interface 904 on the compression/decompression unit 900 is operable to receive data that is used by the compression/decompression unit 900 to determine whether to operate in bypass mode where the output data is the same as the input data received on the first interface.

As illustrated in the first and second examples above, a user inserted term in a kernel definition in a computer program language description of a system is used to specify that compression is required for an argument. The examples described above use a term to describe that data over an IO link and to memory is to be compressed. It should be appreciated that other terms may be used to indicate that only data over the IO link (and not to the memory) or only data transmitted to the memory (and not over the IO link) should be compressed or that no compression should be performed at all.

Referring back to FIG. 1, the system generated may be analyzed a number of different ways. For example, error checking may be performed by a host program executed outside of the target device to determine whether the compression status of data on the target device is consistent. According to an embodiment of the present invention, the host program tracks the compression status of data stored in a memory associated with the target device to avoid problems where compressed data is used as uncompressed data, or vice versa. In this embodiment, the host program tracks which memory ranges in the memory are compressed, and confirms that compressed regions are passed only as compressed arguments to kernels, and uncompressed regions are passed as uncompressed arguments. When an operation executed on the target device expects data associated with one argument to be in a compression state that is inconsistent with its compression status a notification may be transmitted. It should be appreciated that the system may be modified such that a compression operation is added to put the data associated with the one argument in a compression state that is consistent with its compression status.

The system may also be analyzed to determine whether the compression procedures being executed on the target device are yielding expected benefits. The efficiency of the compression procedures may be measured by observing an overall run-time of a kernel with compression and without compression. According to an embodiment of the present invention, an efficiency of compression for data transferred between the target device and an external component is measured. A notification is generated when the efficiency of compression is below a threshold value.

Figure 10:
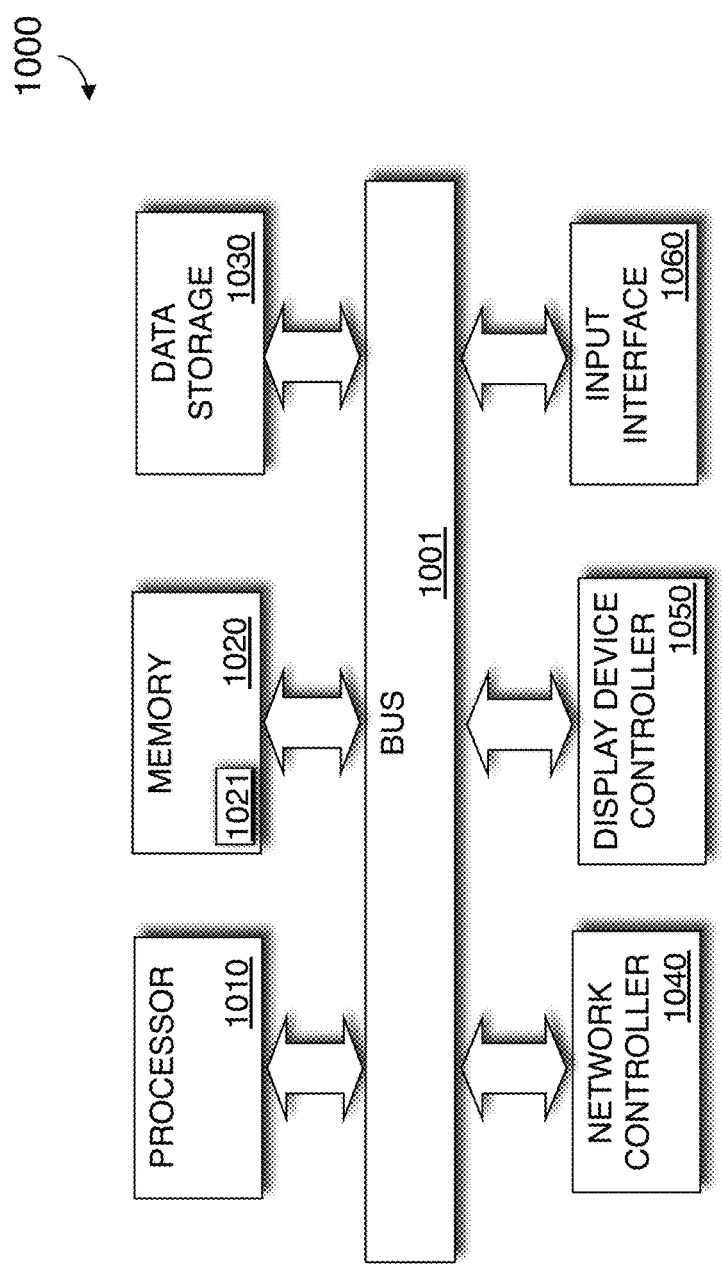
FIG. 10 illustrates a block diagram of a computer system implementing a system designer according to an embodiment of the present invention.

FIG. 10 is a block diagram of an exemplary computer system 1000 in which an example embodiment of the present invention resides. The computer system 1000 includes a processor 1010 that process data signals. The processor 1010 is coupled to a bus 1001 or other switch fabric that transmits data signals between processor 1010 and other components in the computer system 1000. The computer system 1000 includes a memory 1020. The memory 1020 may store instructions and code represented by data signals that may be executed by the processor 1010. A data storage device 1030 is also coupled to the bus 1001

A network controller 1040 is coupled to the bus 1001. The network controller 1040 may link the computer system 1000 to a network of computers (not shown) and supports communication among the machines. A display device controller 1050 is coupled to the bus 1001. The display device controller 1050 allows coupling of a display device (not shown) to the computer system 1000 and acts as an interface between the display device and the computer system 1000. An input interface 1060 is coupled to the bus 1001. The input interface 1060 allows coupling of an input device (not shown) to the computer system 1000 and transmits data signals from the input device to the computer system 1000.

A system designer 1021 may reside in the memory 1020 and be executed by the processor 1010. The system designer 1021 may operate to perform high-level compilation, HDL compilation, and program a target device. During the high-level compilation, the system designer 721 may insert one or more compression/decompression units into the HDL in response to detecting a user inserted term in a kernel definition of an argument in the CPL description to signal that the argument requires compression. During the high-level compilation, the system designer may also assigns a compression/decompression algorithm to be implemented by a compression/decompression unit in response to a data type of an argument requiring compression.

Figure 11:
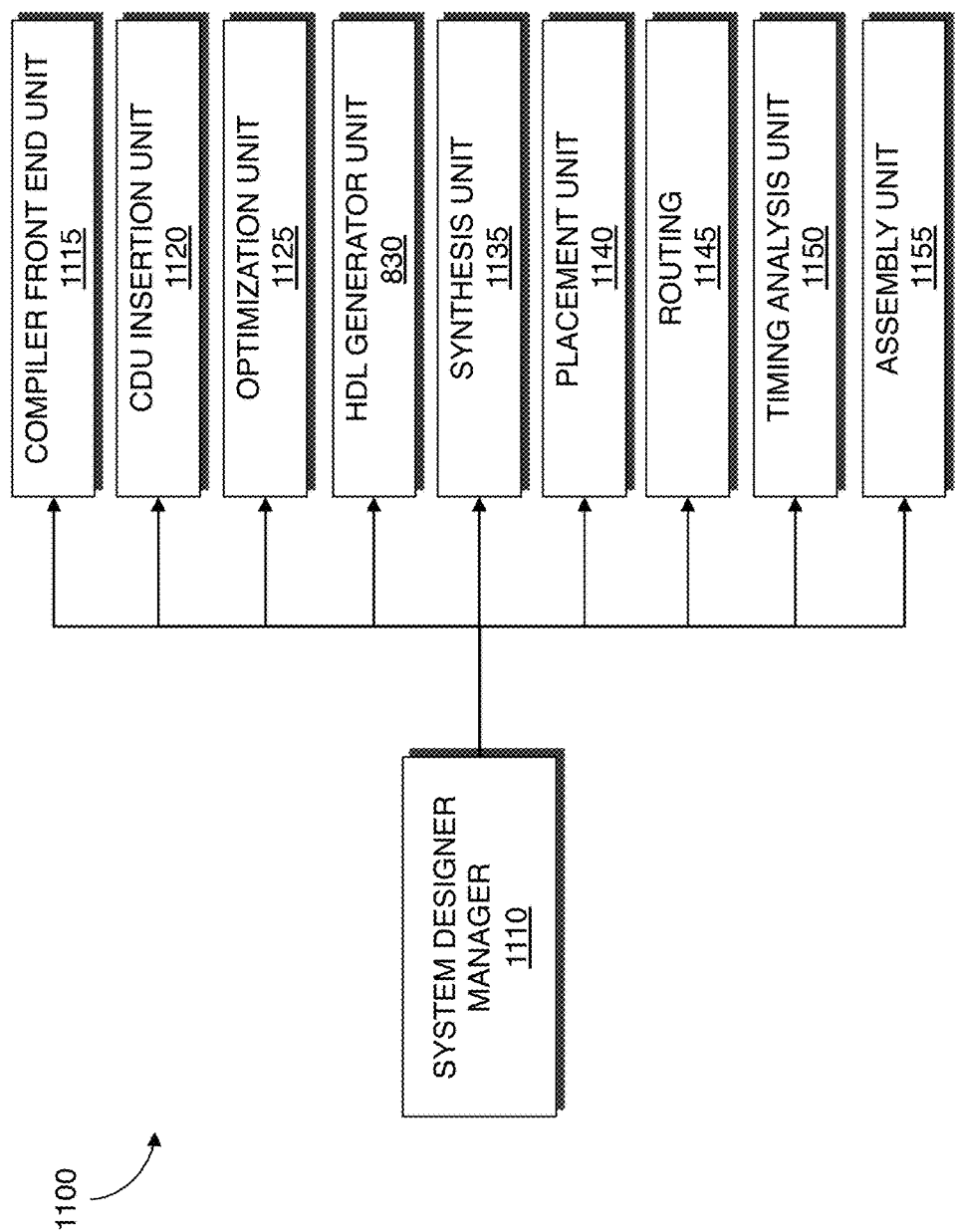
FIG. 11 is a block diagram of a system designer according to an embodiment of the present invention.

FIG. 11 illustrates a system designer 1100 according to an embodiment of the present invention. The system designer 1100 may be an EDA tool for designing a system on a target device such as an FPGA, structured application-specific integrated circuit (ASIC), ASIC, or other circuitry. FIG. 11 illustrates modules implementing an embodiment of the system designer 1100. According to one embodiment, the modules represent software modules and system design may be performed by a computer system such as the one illustrated in FIG. 10 executing sequences of instructions represented by the modules shown in FIG. 11. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 1100 includes a designer manager 1110. The designer manager 1110 is connected to and transmits data between the components of the system designer 1100.

The system designer 1100 includes a compiler front end unit 1115. The compiler front end unit 1115 receives kernel code, which is a computer language description of the system, and translates the kernel code to a compiler intermediate representation.

The system designer 1100 includes a compression/decompression unit (CDU) insertion unit 1120. For arguments in the kernel definition that include a term to indicate that the arguments require data compression, the CDU insertion unit 1120 inserts one or more compression/decompression units into the HDL to facilitate the data compression. Compression/decompression algorithms may be selected for each of the one or more compression/decompression units to perform in response to data types of the arguments.

The system designer 1100 includes an optimization unit 1120. The optimization unit 1120 transforms and optimizes the compiler intermediate representation by mapping it to hardware constructs.

The system designer 1100 includes a HDL generator unit 1130. The HDL generator generates HDL for the design of the system. The HDL describes the operation of the system to be programmed on the target device. The HDL description provides high-level representations of a circuit in terms of the flow of signals (or transfer of data) between hardware registers, and the logic operations performed on those signals.

The system designer 1100 includes a synthesis unit 1135 that performs synthesis. The synthesis unit 1135 generates a logic design of a system to be implemented on the target device. According to an embodiment of the system designer 1100, the synthesis unit 1135 takes a conceptual HDL design definition and generates an optimized logical representation of the system. The optimized logical representation of the system generated by the synthesis unit 1135 may include a representation that has a reduced number of functional blocks and registers, such as logic gates and logic elements, required for the system. Alternatively, the optimized logical representation of the system generated by the synthesis unit 1135 may include a representation that has a reduced depth of logic and that generates a lower signal propagation delay.

The synthesis unit 1135 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 1100 includes a placement unit 1140 that processes the optimized technology-mapped netlist to produce a placement for each of the functional blocks. The placement identifies which components or areas on the target device are to be used for specific functional blocks and registers.

The system designer 1100 includes a routing unit 1145 that performs routing. The routing unit 1145 determines the routing resources on the target device to use to provide interconnection between the components implementing functional blocks and registers of the logic design.

The system designer 1100 includes a timing analysis unit 1150 that performs timing analysis to determine whether timing constraints of the system are satisfied. The timing analysis unit 1150 may generate report files which identify the area required for implementing the system on the target device, the largest slack value for a path in a section of the system, and other statistics.

The system designer 1100 includes an assembly unit 1155 that performs an assembly procedure that creates a data file that includes the design of the system generated by the system designer 1100. The data file may be a bit stream that may be used to program the target device. The assembly unit 1155 may output the data file so that the data file may be stored or alternatively transmitted to a separate machine used to program the target device. It should be appreciated that the assembly unit 1155 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 12:
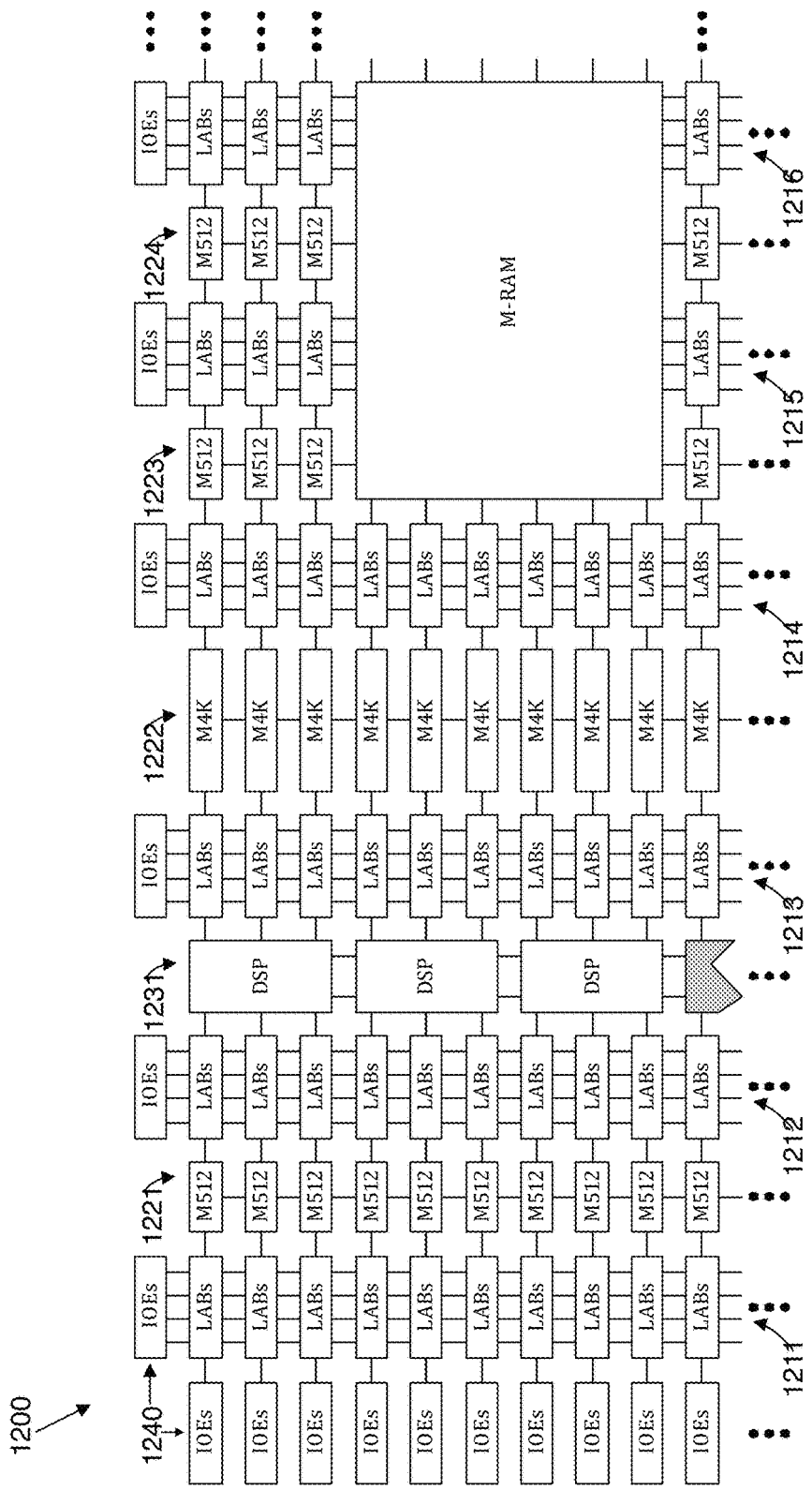
FIG. 12 illustrates an exemplary target device operable to be programmed with a compression/decompression unit according to an embodiment of the present invention.

FIG. 12 illustrates a device 1200 that may be used to implement a target device according to an embodiment of the present invention. The device 1200 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1200. Columns of LABs are shown as 1211-1216. It should be appreciated that the logic block may include additional or alternate components.

The device 1200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1200. Columns of memory blocks are shown as 1221-1224.

The device 1200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1200 and are shown as 1231.

The device 1200 includes a plurality of input/output elements (IOEs) 1240. Each IOE feeds an IO pin (not shown) on the device 1200. The IOEs 1240 are located at the end of LAB rows and columns around the periphery of the device 1200. Each IOE may include a bidirectional IO buffer and a plurality of registers for registering input, output, and output-enable signals.

The device 1200 may include routing resources such as LAB local interconnect lines, row interconnect lines ("H- type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for performing a high-level compilation of a computer program language (CPL) description of a system to generate a hardware description language (HDL) of the system, comprising:
   inserting one or more compression/decompression units into the HDL in response to detecting a user inserted term in a kernel definition of an argument in the CPL description to indicate that the argument requires compression, wherein the compression/decompression units in the HDL describe how to implement the compression/decompression units in hardware on a target device by describing a structure and behavior of the compression/decompression units for implementation in hardware.

2. The method of claim 1, wherein inserting the one or more compression/decompression units comprises implementing a compression/decompression unit for an input output (IO) interface unit to decompress data received from the IO interface unit and to compress data transmitted to the IO interface unit.

3. The method of claim 1, wherein inserting the one or more compression/decompression unit comprises implementing a compression/decompression unit for a load store unit (LSU) to decompress data received from a memory and to compress data transmitted to the memory.

4. The method of claim 2, wherein implementing the compression/decompression unit for the IO interface unit is performed in response to determining that data corresponding to at least one argument is uncompressed over the IO interface.

5. The method of claim 2, wherein implementing the compression/decompression unit for the IO interface unit is performed in response to determining that data for at least one argument is uncompressed in a memory on the target device.

6. The method of claim 3, wherein implementing the compression/decompression unit for the LSU is performed in response to determining that data for the LSU is compressed in the memory.

7. The method of claim 3, wherein implementing the compression/decompression unit for the LSU is performed in response to determining that the LSU utilizes random indexing.

8. The method of claim 1, wherein inserting the one or more compression/decompression units comprises:
   implementing a compression/decompression unit for a load store unit (LSU) to decompress data received from a memory and to compress data received from the LSU if all load store units (LSUs) on the target device are operable to access compressed data from the memory; and
   implementing the compression/decompression unit for an IO interface unit to decompress data received from the IO interface unit and to compress data received from the memory if an LSU utilizes random indexing.

9. The method of claim 1 further comprising assigning a compression/decompression algorithm to be implemented by the one or more compression/decompression units in response to identifying a data type of the argument.

10. A non-transitory computer readable medium including a sequence of instructions stored thereon for causing a computer to execute a method, comprising:
    performing a high-level compilation of a computer program language (CPL) description of a system to generate a hardware description language (HDL) of the system, wherein the high-level compilation assigns a compression/decompression algorithm to be implemented by one or more compression/decompression units in response to a data type of an argument, further comprising inserting the one or more compression/decompression units into the HDL in response to detecting a user inserted term in a kernel definition of the argument in the CPL description that indicates that the argument requires compression.

11. The non-transitory computer readable medium of claim 10, wherein the data type comprises one of an integer, single-precision floating point, and a double-precision floating point.

12. The non-transitory computer readable medium of claim 10, wherein inserting the one or more compression/decompression units comprises implementing a compression/decompression unit for an input output (IO) interface unit to decompress data received from the IO interface unit and to compress data transmitted to the IO interface unit.

13. The non-transitory computer readable medium of claim 10, wherein inserting the one or more compression/decompression unit comprises implementing a compression/decompression unit for a load store unit (LSU) to decompress data received from a memory and to compress data transmitted to the memory.

14. The non-transitory computer readable medium of claim 10, wherein inserting the one or more compression/decompression units comprises:
    implementing a compression/decompression unit for a load store unit (LSU) to decompress data received from a memory and to compress data received from the LSU if all load store units (LSUs) on a target device are operable to access compressed data from the memory; and
    implementing the compression/decompression unit for an IO interface unit to decompress data received from the IO interface unit and to compress data received from the memory if an LSU utilizes random indexing.

15. The non-transitory computer readable medium of claim 10, wherein the user inserted term indicates that only data associated with the argument that is transmitted over an input output (IO) interface requires compression.

16. The non-transitory computer readable medium of claim 10, wherein the user inserted term indicates that only data associated with the argument that is transmitted to a memory on a target device requires compression.

17. The non-transitory computer readable medium of claim 10 wherein the method further comprises:
    programming a target device with the HDL; and
    analyzing the system on the target device.

18. The non-transitory computer readable medium of claim 17, wherein analyzing the system on the target device comprises:
    tracking a compression status of data associated with arguments stored in a memory of the target device; and
    generating a first notification when an operation executed on the target device expects data associated with one argument to be in a compression state that is inconsistent with its compression status.

19. The non-transitory computer readable medium of claim 18 further comprising modifying the system such that a compression operation is added to put the data associated with the one argument in a compression state that is consistent with its compression status.

20. The non-transitory computer readable medium of claim 18 further comprising:
measuring an efficiency of compression for data transferred between the target device and an external component; and
generating a second notification when the efficiency of compression is below a threshold value.

21. The non-transitory computer readable medium of claim 10, wherein the high-level compilation assigns the compression/decompression algorithm in response to the data type such that the compression/decompression algorithm supports a speed of an external memory interface.

22. The non-transitory computer readable medium of claim 10, wherein the compression/decompression units in the HDL describe how to implement the compression/decompression units on a target device with programmable resources by describing a structure and behavior of the compression/decompression units for implementation in hardware.

23. The method of claim 9, wherein assigning the compression/decompression algorithm comprises assigning a compression/decompression algorithm in response to the data type such that the compression/decompression algorithm supports a speed of an external memory interface.

24. A method for performing a high-level compilation of a computer program language (CPL) description of a system to generate a hardware description language (HDL) of the system, comprising:
inserting one or more compression/decompression units into the HDL in response to detecting a user inserted term in a kernel definition of an argument in the CPL description to indicate that the argument requires compression, wherein the compression/decompression units in the HDL describe a structure and behavior of the compression/decompression units for implementation in hardware.

25. The method of claim 24 further comprising assigning a compression/decompression algorithm to be implemented by the one or more compression/decompression units in response to identifying a data type of the argument.

26. The method of claim 25, wherein assigning the compression/decompression algorithm comprises assigning the compression/decompression algorithm in response to the data type such that the compression/decompression algorithm supports a speed of an external memory interface.

27. The non-transitory computer readable medium of claim 10, wherein assigning the compression/decompression algorithm comprises assigning the compression/decompression algorithm in response to the data type such that the compression/decompression algorithm supports a speed of an external memory interface.

* * * * *